United States Patent
Gandhi (10) Patent No.: US 7,874,576 B2
(45) Date of Patent: Jan. 25, 2011

(54) ADJUSTABLE AIRBAG SYSTEMS FOR VEHICLES

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 21 days.

(21) Appl. No.: 12/424,685

(22) Filed: Apr. 16, 2009

(65) Prior Publication Data

US 2010/0264629 A1 Oct. 21, 2010

(51) Int. Cl.
*B60R 21/20* (2006.01)

(52) U.S. Cl. .................................. 280/728.2

(58) Field of Classification Search ............. 280/728.2, 280/735
See application file for complete search history.

(56) References Cited

U.S. PATENT DOCUMENTS

| | | | | |
|---|---|---|---|---|
| 3,623,768 | A * | 11/1971 | Capener et al. | 297/330 |
| 3,782,492 | A * | 1/1974 | Hollins | 180/271 |
| 5,074,583 | A * | 12/1991 | Fujita et al. | 280/730.1 |
| 5,324,071 | A * | 6/1994 | Gotomyo et al. | 280/730.1 |
| 5,344,184 | A * | 9/1994 | Keeler et al. | 280/730.1 |
| 5,507,521 | A * | 4/1996 | Steffens, Jr. | 280/775 |
| 5,723,789 | A * | 3/1998 | Shannon | 73/514.31 |
| 5,730,458 | A * | 3/1998 | Byon | 280/730.2 |
| 5,820,162 | A * | 10/1998 | Fink | 280/742 |
| 5,871,233 | A * | 2/1999 | Tanaka et al. | 280/777 |
| 5,906,393 | A * | 5/1999 | Mazur et al. | 280/735 |
| 6,241,279 | B1 * | 6/2001 | Ochiai | 280/735 |
| 6,416,080 | B1 * | 7/2002 | Gillis et al. | 280/735 |
| 6,435,549 | B1 * | 8/2002 | Ochiai | 280/735 |
| 6,497,431 | B1 | 12/2002 | Schramm | |
| 6,501,536 | B1 | 12/2002 | Fredricks | |
| 6,527,295 | B2 * | 3/2003 | Muller | 280/728.3 |
| 6,532,408 | B1 | 3/2003 | Breed | |
| 6,533,316 | B2 | 3/2003 | Breed et al. | |
| 6,869,100 | B2 | 3/2005 | Breed et al. | |
| 6,918,459 | B2 | 7/2005 | Breed | |
| 6,959,944 | B2 * | 11/2005 | Mori et al. | 280/728.2 |
| 6,983,954 | B2 * | 1/2006 | Sakaguchi | 280/728.2 |
| 7,098,674 | B2 * | 8/2006 | Stanley et al. | 324/662 |

(Continued)

FOREIGN PATENT DOCUMENTS

DE 19853322 5/2000

(Continued)

OTHER PUBLICATIONS

PCT International Search Report for corresponding PCT Intl. Appln. No. PCT/US2010/031334, dated Jul. 20, 2010.

*Primary Examiner*—Paul N Dickson
*Assistant Examiner*—Nicole Verley
(74) *Attorney, Agent, or Firm*—Dinsmore & Shohl LLP (57) ABSTRACT

Adjustable airbag systems for a vehicle may comprise an airbag assembly having an inflatable airbag within a housing and an actuator associated with the housing, a sensor operable to measure a physical characteristic of an occupant of the vehicle, and a controller in communication with the sensor and the actuator such that upon receiving a feedback signal from the sensor relating to the physical characteristic of the occupant, the controller sends a control signal to the actuator to adjust a position of the housing with respect to the occupant.

20 Claims, 4 Drawing Sheets

U.S. PATENT DOCUMENTS

| | | | |
|---|---|---|---|
| 7,120,554 B2 | 10/2006 | Gray et al. | |
| 7,201,394 B2 * | 4/2007 | Mori et al. | 280/728.3 |
| 7,204,511 B2 * | 4/2007 | Mori et al. | 280/731 |
| 7,234,727 B2 * | 6/2007 | Mori et al. | 280/730.1 |
| 7,260,461 B2 * | 8/2007 | Rao et al. | 701/45 |
| 7,461,861 B2 | 12/2008 | Keshavaraj | |
| 7,500,693 B2 * | 3/2009 | Guth et al. | 280/728.3 |
| 2001/0010424 A1 * | 8/2001 | Osmer et al. | 280/735 |
| 2004/0066023 A1 | 4/2004 | Joseph | |
| 2005/0269810 A1 | 12/2005 | Breed et al. | |
| 2007/0046003 A1 * | 3/2007 | Mori et al. | 280/731 |
| 2007/0080013 A1 | 4/2007 | Melz et al. | |
| 2007/0083311 A1 | 4/2007 | Tabe | |
| 2008/0023946 A1 | 1/2008 | Haag et al. | |
| 2008/0119993 A1 | 5/2008 | Breed | |
| 2008/0234898 A1 | 9/2008 | Wiener | |
| 2008/0315564 A1 | 12/2008 | Muller | |

FOREIGN PATENT DOCUMENTS

| | | |
|---|---|---|
| DE | 19925377 | 12/2000 |
| DE | 10353446 | 7/2005 |
| DE | 102006027472 | 12/2007 |
| EP | 0357225 | 3/1990 |
| EP | 0832013 | 4/1998 |
| WO | WO01/44026 | 6/2001 |

* cited by examiner

ADJUSTABLE AIRBAG SYSTEMS FOR VEHICLES

TECHNICAL FIELD

The present invention generally relates to adjustable airbag systems for vehicles and, more specifically, to systems that selectively adjust the position of the airbag based on the physical characteristics of the occupant.

BACKGROUND

As background, automobile manufacturers may incorporate multiple airbags into their vehicles as part of a comprehensive safety system. The airbags are designed to protect the occupants in the event of a crash and are placed in strategic locations throughout the vehicle in order to maximize such protection. Consequently, airbags are designed in a variety of shapes and sizes.

One drawback of such safety systems is that the protection afforded by the airbags can be inconsistent due to the difference in size from one occupant to another. For example, a side impact airbag, designed to protect the chest of an occupant, may provide a higher level of safety for a six-foot-tall occupant than for a five-foot-tall occupant. Automobile manufacturers have traditionally taken two approaches to solve this problem. First, a larger airbag can be designed which would cover all sizes of occupants. This solution, however, may lead to higher cost and weight for the airbag (as well as for the supporting electrical and mechanical components necessary for its implementation). Second, the airbag can be designed to cover only limited areas of the occupant. Although this approach may work reasonably well for "average" size occupants, it can compromise the safety for very small and very large occupants.

Accordingly, a need exists for adjustable airbag systems which reduce cost and weight, yet can accommodate automobile/vehicle occupants of all shapes and sizes.

SUMMARY

In one embodiment, an adjustable airbag system for a vehicle comprises an airbag assembly having an inflatable airbag within a housing and an actuator associated with the housing, a sensor operable to measure a physical characteristic of an occupant of the vehicle, and a controller in communication with the sensor and the actuator such that upon receiving a feedback signal from the sensor relating to the physical characteristic of the occupant, the controller sends a control signal to the actuator to adjust a position of the housing with respect to the occupant.

In another embodiment, a vehicle may have an adjustable airbag system secured to a structure of the vehicle, the system comprising an airbag assembly having an inflatable airbag within a housing and an actuator associated with the housing wherein the housing is secured to the structure of the vehicle, a sensor operable to measure a physical characteristic of an occupant of the vehicle, and a controller in communication with the sensor and the actuator such that upon receiving a feedback signal from the sensor relating to the physical characteristic of the occupant, the controller sends a control signal to the actuator to adjust a position of the housing with respect to the occupant.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

As used herein, the word "vehicle" means an automobile, a sport utility vehicle (SUV), a pick-up truck, a semi tractor trailer, a bus, a motorcycle, a scooter or any other similar means of transporting people. In addition, as used herein, a "structure of the vehicle" may refer to any component or structure of the vehicle which may be considered a permanent part of the vehicle, including but not limited to the roof, the dashboard, the door, the seat (including the seat back and/or frame), and the steering wheel. Also, as used herein, the word "occupant" may mean the driver of the vehicle or a passenger in or on the vehicle.

Embodiments generally relate to adjustable airbag systems. An inflatable airbag is normally disposed inside an airbag housing until it is inflated (i.e., deployed), which may occur during a vehicle impact (i.e., crash). The position of the housing may be adjusted by actuators operable to tilt the airbag housing either up or down. Adjusting the position of the airbag housing may operate to adjust the position of the inflated (deployed) airbag with respect to a structure of the vehicle and/or the vehicle occupant. Sensors in the adjustable airbag system may operate to estimate an occupant's physical characteristic, such as weight and/or height. A controller may receive the feedback signal(s) from the sensor(s), representing the physical characteristic, and adjust the airbag housing to accommodate the occupant based on this physical characteristic. The airbag housing may be mechanically coupled, through the actuators, to a structure of the vehicle, such as a door or seat frame. One or more adjustable airbag systems may be installed in the vehicle.

Figure 1:
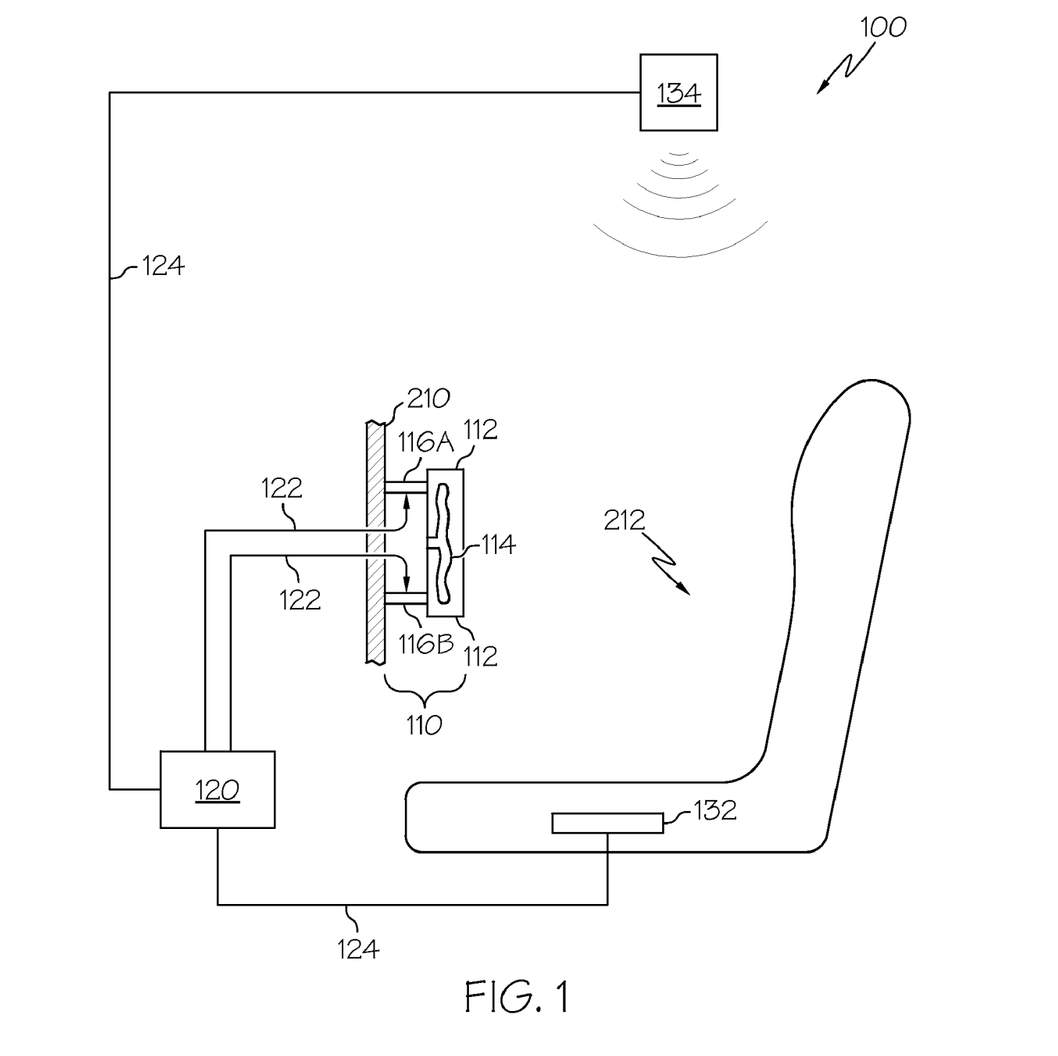
FIG. 1 depicts an adjustable airbag system according to one or more embodiments shown and described herein.

Referring to the drawings, FIG. 1 generally depicts one embodiment of the adjustable airbag system 100. As illustrated, the adjustable airbag system 100 may include an airbag assembly 110, a controller 120 and sensors 132, 134. The airbag assembly 110 may comprise an airbag housing 112, an inflatable airbag 114 (schematically shown as not being deployed), and one or more actuators 116A, 116B associated with the housing 112. The inflatable airbag 114 may be disposed in or on the housing 112 before it is inflated. The housing 112 may also comprise electronics and other components (not shown) necessary for inflating the inflatable airbag 114.

The actuators 116A, 116B may be mechanically coupled to the housing 112 as well as mechanically coupled to a structure 210 of the vehicle. The structure 210 of the vehicle may include, without limitation, the roof, the dashboard, a door, a seat, or the steering wheel. Other structures of the vehicle may be used which permit the airbag housing to be installed in various locations in the vehicle. The actuator may comprise any mechanical system associated with the airbag housing and operable to adjust its position. The mechanical system may employ a number of techniques to mechanically couple the structure of the vehicle, the airbag housing, and the actuator, such that the actuator is operable to adjust the position of the airbag housing. As discussed later herein, the adjustment of the airbag housing ultimately adjusts the position of the inflatable airbag 114 prior to inflation in order to achieve a targeted contact area with the occupant should the airbag be deployed. The actuators 116A, 116B may adjust the position of the airbag housing 112 upon reception of one or more actuator control signals 122. Also as discussed later herein, the actuators may operate to tilt the airbag housing 112 either clockwise or counterclockwise and, thus, adjust the position of the inflatable airbag 114 (when deployed) either up or down.

Figure 2A:
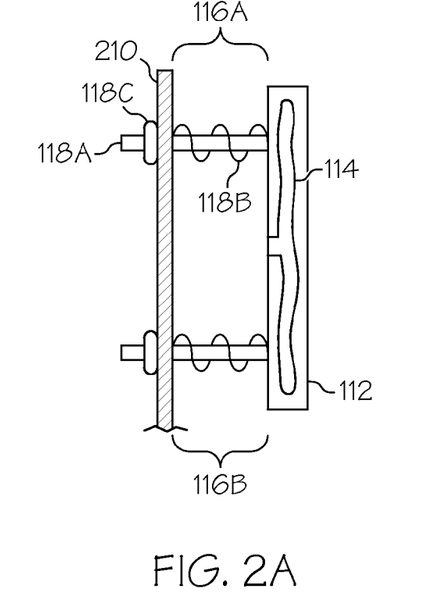
FIGS. 2A-B depict actuators according to one or more embodiments shown and described herein.

FIGS. 2A and 2B depict two possible embodiments of the actuators. However, it will be understood that many other embodiments of the actuator are possible. In FIG. 2A, the actuators 116A, 116B may comprise a bolt 118A, a spring 118B and a nut 118C. The bolt 118A may mechanically couple the airbag housing 112 to a structure 210 of the vehicle. The spring 118B may bias the housing 112 away from the structure 210. The nut 118C holds the housing 112 in place and may prevent the spring 118B from pushing the bolt 118A out of the structure 210. The bolt 118A may comprise a Shape Memory Alloy (SMA) type of material which may be activated by heating or the application of an electrical current. For example, in one embodiment, when electrical current is applied to the bolt 118A, the bolt may contract and cause the airbag housing 112 to move toward the structure 210, thus, compressing the spring 118B. The actuators 116A, 116B may be independently operated and, as such, the operation of the two actuators 116A, 116B in FIG. 2A may cause the airbag housing 112 to rotate either clockwise or counterclockwise, depending on whether electrical current is applied to one or the other actuator.

Figure 2B:
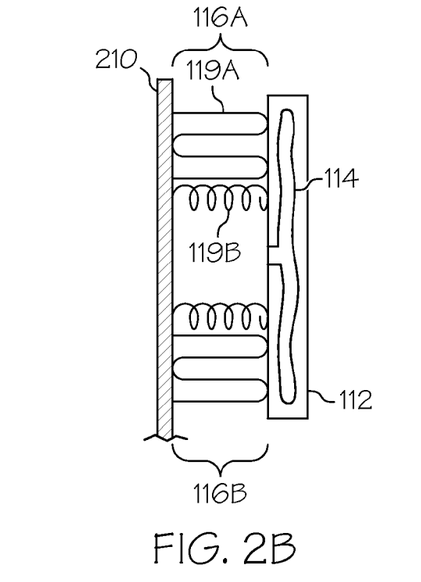

FIG. 2B shows another embodiment of the actuator using SMA technology. In this embodiment, the actuators 116A, 116B comprises a wire 119A and a spring 119B. The wire 119A may comprise an SMA material, which, as discussed above, may contract when an electrical current is applied to it. The spring 119B may bias the housing 112 away from the vehicle structure 210 and may also mechanically couple the housing to the structure. Other structural elements (not shown) may operate (in cooperation with the actuators 116A, 116B) to assist in coupling the housing 112 to the structure 210. The actuators 116A, 116B permit one or both ends the airbag housing 112 to be moved toward the vehicle structure 210. The spring 119B may also keep the airbag housing at a fixed distance from the structure 210 and opposes the force of the actuators 116A, 116B. As a result, applying a current to the SMA wire 119A may cause it to contract, resulting in the position of the inflatable airbag 114 (when deployed) being raised or lowered, depending on which actuator is being activated.

The SMA materials used in these actuators 116A, 116B include, without limitation, copper-zinc-aluminum-nickel alloys, copper-aluminum-nickel alloys, and nickel-titanium alloys. However, it will be understood that other SMA materials may be used for the actuators, including those known presently in the art and those yet to be developed. In one embodiment, the bolt 118A or wire 119A may comprise an alloy of nickel-titanium, such as Nitinol. When no electrical current is applied, the bolt 118A or wire 119A may assume one shape. However, when an electrical current is applied to the bolt 118A or wire 119A, it may contract and result in the actuator changing the position of the airbag housing as discussed herein. The electrical current applied to the SMA actuator may constitute the control signal representing the desired position of the airbag housing.

In another embodiment, the actuators may comprise a piezoelectric material including, without limitation, lithium niobate, lithium tantalate, lead titanate, or polyvinylidene fluoride. When the actuator comprises a piezoelectric materials, the actuators may assume a variety of shapes, sizes, and configurations. The piezoelectric actuator may mechanically couple the airbag housing 112 to the vehicle structure 210. In addition, the piezoelectric actuator may be operable to receive a control signal representing the desired position of the airbag housing. One or more piezoelectric actuators may be used to adjust the position of the airbag housing.

Yet another embodiment may include an actuator comprising an electro-active polymer (EAP) material. The EAP actuator may mechanically couple the airbag housing 112 to the structure 210 of the vehicle. In addition, the EAP actuator may be operable to receive a control signal representing the desired position of the airbag housing. One or more EAP actuators may be used to adjust the position of the airbag housing.

In still another embodiment, electro-mechanical actuators may be used to adjust the position of the airbag housing. Such actuators may include (but are not limited to) electrical motors and solenoids. When the actuator comprises an electrical motor, gears, rack and pinions, or other such devices may be employed to facilitate the adjustment of the airbag. When the actuator comprises a solenoid, the solenoid may be able to adjust the position of the airbag to two or more discrete positions. In either case, the electro-mechanical actuator may be mechanically coupled to the vehicle structure as well as the airbag housing. Numerous embodiments using electro-mechanical actuators are possible.

Although the disclosed embodiments of the actuator include SMA, piezoelectric, EAP, and conventional electro-mechanical devices, it is contemplated that other types of actuators may also be used to adjust the position of the airbag housing, including yet-to-be-discovered actuators. Consequently, any of these actuators may be used to adjust the position of the airbag housing as described herein. Furthermore, various combinations of different actuators may be used to adjust the position of the airbag housing. For example, in one embodiment, the system may include both an electro-mechanical actuator and an SMA actuator. In such a system, the electro-mechanical actuator may provide a coarse position adjustment, while the SMA actuator may provide a fine position adjustment.

Referring again to FIGS. 2A and 2B, the embodiment depicted utilizes two actuators. However, it is contemplated that other embodiments may only use one actuator. For example, referring to FIG. 2A, the top actuator 116A may be replaced by a hinge or other similar coupling, and only one actuator, such as actuator 116B, may be used to adjust the position of the airbag housing. In this embodiment, the actuator 116B may rotate the airbag about the hinge, thus producing the desired adjustment in the position of the airbag housing, either clockwise and/or counterclockwise. Instead of a hinge, the actuator 116A may be replaced by a flexible adhesive or similar flexible coupling. In yet other embodiments, two or more actuators may be utilized. For example, a housing 112 which is approximately rectangular in shape may have an actuator at each corner. In this fashion, the position of the airbag housing 112 may be adjusted with two degrees of freedom instead of only one degree of freedom, as depicted in FIGS. 2A and 2B. Thus, it is contemplated that different embodiments may use one, two, or more actuators in order to position the airbag housing appropriately.

Referring still to FIG. 2A, as an exemplary embodiment, the actuators 116A, 116B may comprise a bolt 118A comprising an SMA material which has an adjustability of 10% of its overall length. In this exemplary embodiment, the length of the airbag housing is approximately 75 mm between the two actuators 116A, 116B, and the inflated airbag (not shown) is approximately spherical in shape with a radius of 300 mm. Other lengths and shapes of airbag housings are also contemplated. In order to move the airbag housing 112 by +/−2°, the actuator bolt 118A for each actuator 116A, 116B may be approximately 25 mm in length. Thus, an electrical current is applied to the bolt 118A of the upper actuator 116A (but no current to the lower actuator 116B) may cause the bolt 118A to contract by 10%, or 2.5 mm. As a result, the airbag housing 112 may move approximately 2° counterclockwise, and may result in the inflatable airbag (when deployed) being raised approximately 10 mm with respect to the occupant. Similarly, an electrical current applied to the bolt 118A of the lower actuator 116B (but no current to the upper actuator 116A) may cause the bolt 118A to contract by 10% or 2.5 mm. Consequently, the airbag housing 112 may move approximately 2° clockwise, and result in the inflatable airbag (when deployed) being lowered approximately 10 mm with respect to the occupant. Varying amounts of electrical current may be applied to the bolt 118A, which may cause the adjustment of the housing 112, in this example, to be any angle up to +/−2°. In addition, it will be understood that this example is merely illustrative in nature and that other lengths of airbag housings and actuators are possible, as well as other types of SMA materials.

Still referring to FIG. 2A, in another exemplary embodiment, the system may comprise an actuator 116A, 116B with a bolt 118A comprising an SMA material which has an adjustability of 5% of its overall length. In this example, the length of the airbag housing 112 is approximately 75 mm between the two actuators 116A, 116B, and the inflated airbag (not shown) is approximately spherical in shape with a radius of 300 mm. In order to move the airbag housing 112 by +/−2°, the actuator bolt 118A for each actuator 116A, 116B may be approximately 50 mm in length. Thus, an electrical current is applied to the bolt 118A of the upper actuator 116A (but no current to the lower actuator 116B) may cause the bolt 118A to contract by 5%, or 2.5 mm. As a result, the airbag housing 112 may move approximately 2° counterclockwise, and result in the inflatable airbag (when deployed) being raised approximately 10 mm with respect to the occupant. Similarly, an electrical current is applied to the bolt 118A of the lower actuator 116B (but no current to the upper actuator 116A) may cause the bolt 118A to contract by 5% or 2.5 mm. Consequently, the airbag housing 112 may move approximately 2° clockwise, and result in the inflatable airbag (when deployed) being lowered approximately 10 mm with respect to the occupant. Varying amounts of electrical current may be applied to the bolt 118A, which may cause the adjustment of the housing 112, in this example, to be any angle up to +/−2°. In addition, it will be understood that this example is merely illustrative in nature and that other lengths of airbag housings and actuators are possible, as well as other types of SMA materials.

Again referring to FIG. 2A, an exemplary embodiment may have an actuator with an SMA material having an elasticity of 70 apa and a tensile stress of 600 Mpa. For an 8 mm diameter bolt 118A, the force generated by the spring 118B should be less than area of the bolt 118A times the tensile strength of the SMA material comprising the bolt 118A. In this example, the force of the spring 118B should be less than 300 Mpa times 50 mm$^2$, or about 15,000 Newtons. Thus, the spring 118A may be designed to produce a force less than 15,000 Newtons. Other sizes of bolts and different types of SMA materials are contemplated.

Figure 3A:
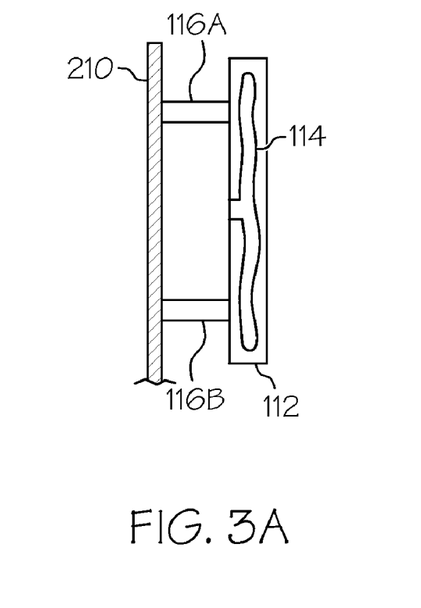
FIGS. 3A-C depict the adjustability of the airbag housing according to one or more embodiments shown and described herein.
Figure 3B:
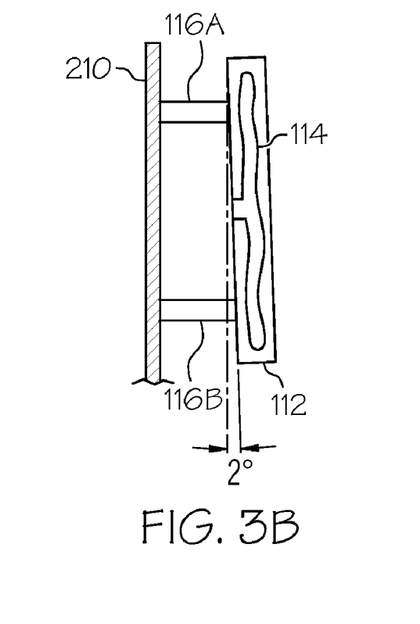
Figure 3C:
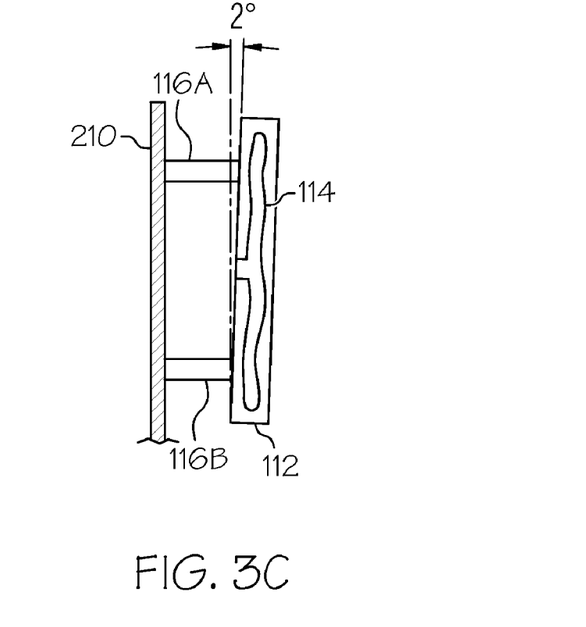

Referring to FIGS. 3A-3C, the adjustability of the airbag housing 112 with respect to the structure 210 of the vehicle is illustrated. The adjustment angle of the airbag housing 112 may be approximately +/−2° with respect to the structure 210 of the vehicle or the occupant. Other embodiments may, of course, comprise airbags of different shapes and sizes, as well as a variety of tilt angles, including, but not limited to 0° to +/−5°.

In FIG. 3A, neither actuator 116A, nor actuator 116B is activated, and as such, the airbag housing 112 is at essentially an angle of about 0° with respect to the structure 210. In FIG. 3B, the actuators are activated such that the airbag housing is rotated counterclockwise by about 2° with respect to the structure 210. Rotation in the housing 112 and/or the inflatable airbag 114 in this manner may cause the inflatable airbag (when deployed) to be raised approximately 10 mm with respect to the occupant. In FIG. 3C, the actuators are activated such that the airbag housing is rotated clockwise by about 2° with respect to the structure 210. This rotation in the housing 112 may cause the inflatable airbag (when deployed) to be lowered approximately 10 mm with respect to the occupant. In this embodiment, the two actuators 116A, 116B may adjust the airbag housing approximately +/−2° with respect to a structure of the vehicle which causes the inflatable airbag 114 (when deployed) to be moved approximately +/−10 mm with respect to the occupant. However, it should be understood that, in other embodiments, there may be more or less adjustment range depending on the physical characteristics of the occupant and/or type of airbag. In addition, depending on the type of actuators and mechanisms incorporating the same, multiple ranges of motion (in addition to an upward and downward tilt) are contemplated.

Figure 4A:
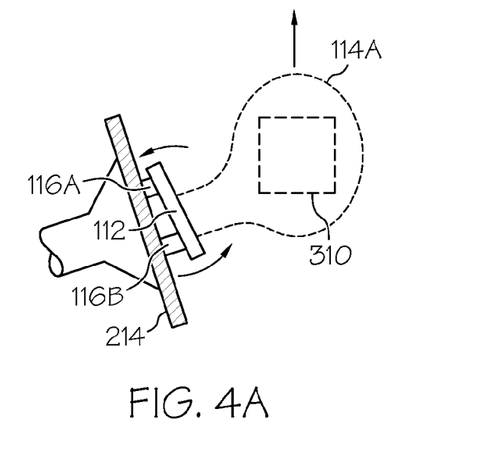
FIGS. 4A-B depict the adjustability of the inflated airbag according to one or more embodiments shown and described herein.
Figure 4B:
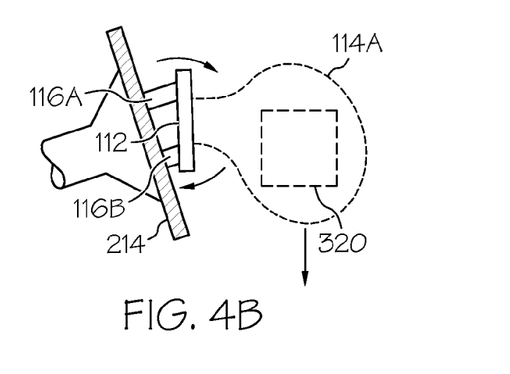

FIG. 4 depicts an embodiment of the adjustable airbag system in which the airbag may be designed to protect the head or chest of a driver/occupant of the vehicle in the event of a front impact (e.g., a front impact airbag system). Here, occupant may be seated in a seat and the airbag housing 112 may be adjusted so that the position of the inflated airbag 114A is adjustable with respect to the seat 212 as well as the occupant. In this embodiment, the airbag housing 112 may be disposed in the steering wheel 214 of the vehicle and may be designed such that the airbag housing 112 does not rotate with the steering wheel 214. In FIG. 4A, the airbag housing 112 is rotated counterclockwise so that the inflated airbag 114A (when deployed) is raised with respect to the occupant. In this example, the raising of the inflated airbag 114A maintains the proper contact area 310 of a relatively tall occupant so that the protection afforded by the airbag system may be improved. In FIG. 4B, the airbag housing 112 is rotated clockwise so that the inflated airbag 114A (when deployed) is lowered with respect to the occupant. In this example, the lowering of the inflated airbag 114A maintains the proper contact area 320 of a relatively short occupant so that the protection afforded by the airbag system may be improved. Other embodiments of the adjustable airbag system may be disposed at various locations in the vehicle and may offer addition protection for the occupant.

Referring again to FIG. 1, the adjustable airbag system 100 may also comprise a controller 120 which may be in electrical communication with the actuators 116A, 116B. The controller 120 may be operable to generate and send the actuator control signals 122 to the respective actuators. In this fashion, the controller may be operable to adjust the position of the airbag housing 112 and, consequently, of the inflatable airbag 114. The adjustable airbag system 100 may further comprise a sensor or sensors 132, 134 which may be operable to generate a feedback signal 124. The controller may be in electrical communication with the sensors 132, 134 and may be operable to receive the feedback signals 124 generated by the respective sensors. Types of sensors used may include a weight (e.g., pressure) sensor 132 and/or a height sensor 134. The feedback signal 124 generated by the sensor may represent a physical characteristic measured by the sensor. For example, a weight sensor 132 may send a feedback signal 124 to the controller 120 representing the weight of an occupant of the vehicle. As another example, the height sensor 134 may send a feedback signal 124 to the controller representing the height of an occupant of the vehicle. Other types of sensors may also be used, either alone or in combination with other sensors. The weight sensor 132 may be disposed in a seat 212 of the vehicle or other suitable location. The height sensor 134 may be disposed in the roof of the vehicle or other suitable location.

Figure 6:
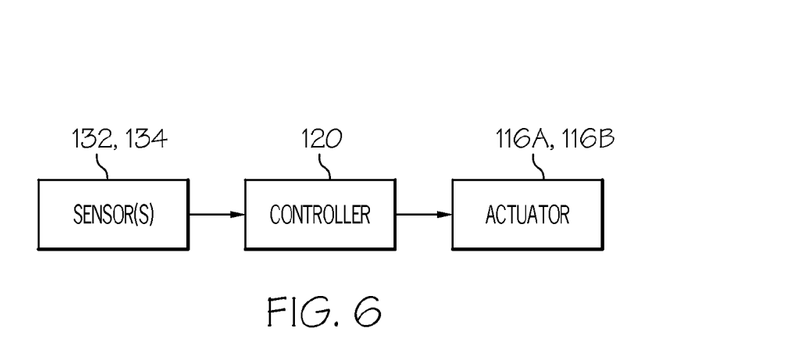
FIG. 6 schematically depicts the relationship between the sensor(s), the controller, and the actuator(s) according to one or more embodiments shown and described herein.

Still referring to FIG. 1, the adjustable airbag system 100 may adjust the position of the airbag housing 112 based solely on the feedback signal from the weight sensor 132. In this embodiment, the weight sensor 132 may be operable to estimate the weight of the occupant of the seat and may send an feedback signal 124 to the controller 120 representing the occupant's weight. The controller 120 may receive this feedback signal 124 and may use it to determine a position of the airbag housing 112 which may improve the protection of the seat occupant. The controller 120 may determine this position by estimating the height of the occupant simply based on the weight sensor 132. As shown in FIG. 6, the height of a person is generally proportional to the person's weight. Thus, the desired position of the airbag housing 112 may directly depend on the output of the weight sensor 132. Referring back to FIG. 1, the controller 120 may send a control signal 122 to the actuators 116A, 116B in order to cause the actuators to move the airbag housing to the desired position, based on the occupant's estimated weight. As already discussed herein, the position of the airbag housing 112 directly affects the position of the inflatable airbag 114 when it is deployed.

As an example, when an occupant is seated in the vehicle, the weight sensor 132 may send a feedback signal 124 to the controller 120 indicating that the occupant weighs 150 pounds. The controller 120 may receive this information and determine that, based on the design of the vehicle, a person of this weight is typically 5 feet, 8 inches tall. Accordingly, the controller 120 may determine that the position of the airbag housing 112 should be adjusted so that the position of the inflatable airbag (when deployed) is lowered 3 mm in order to accommodate a person of this height. Thus, the controller 120 may send a control signal 122 to the actuators 116A, 116B in order to cause them to adjust the position of the airbag housing 112 accordingly. In this fashion, the adjustment may improve the protection of the occupant afforded by the inflatable airbag 114.

Other embodiments may include additional sensors which may assist the controller 120 in determining the occupant's weight and/or height. These sensors may be placed in or around the seat 212 and may allow the controller 120 to more accurately determine the occupant's weight and/or height. For example, a sensor may be placed in the seatback of the seat and used in conjunction with the weight sensor 132 in order to determine the occupant's weight. The additional sensor or sensors may be in electrical communication with the controller 120, and may send a feedback signal 124 to the controller, generally representing a physical characteristic, such as pressure. The controller 120 may use these additional signal inputs in order to estimate the occupant's height. Those skilled in the art may recognize that many different types and combinations of sensors may be used to estimate the occupant's weight, height, or other physical characteristic.

Still referring to FIG. 1, yet another embodiment may include a height sensor 134. This sensor may be of the ultrasonic type, and may measure the position of the occupant's head or torso with respect to the sensor. The height sensor 134 may send a feedback signal 124 to the controller 120 representing the height of the occupant. Thus, the desired position of the airbag housing 112 may directly depend on the output of the height sensor 134.

As an example, when an occupant is seated in the vehicle, the height sensor 134 may send a feedback signal 124 to the controller 120 indicating that the top of the occupant's head is 2 inches from the height sensor 134. The controller 120 may receive this information and determine that, based on the design of the vehicle, the occupant is 6 feet, 2 inches tall. Accordingly, the controller 120 may determine that the position of the airbag housing 112 should be adjusted so that the position of the inflated airbag is raised 7 mm in order to accommodate a person of this height. Thus, the controller 120 may send a control signal to the actuators 116A, 116B in order to cause them to adjust the position of the airbag housing 112 so that the position of the inflatable airbag (when deployed) is raised 7 mm in order to accommodate a person of this height. In this fashion, the method may improve the protection of the occupant afforded by the adjustable airbag system 100.

The controller 120 may use both the weight sensor 132 and the height sensor 134 in order to determine the position of the airbag housing 112 which improves the protection of the occupant. As another example, the controller may combine the weight sensor 132 and the height sensor 134 in order to estimate the occupant's height. This may be desirable if the accuracy of the height sensor 134 is reduced due, for example, to its location in the vehicle. In this case, the controller 120 may estimate the height of the person based solely on the weight sensor 132 (as discussed above) and estimate the height of the person based solely on the height sensor 134 (as discussed above). The controller 120 then may estimate the occupant's height based on some combination of the two estimates, for example, by taking the simple average of the two or by weighting one in favor of the other (e.g., 75% for the height sensor estimate and 25% for the weight sensor estimate). Those skilled in the art may recognize many other possible embodiments in which one or more sensors are used to estimate the occupant's height.

Information about the physical characteristics of the occupant may also be obtained through other means. For example, the driver may possess a vehicle key, on which is electronically stored a multitude of information about him or her.

When the driver installs the key in the vehicle (to start and operate the vehicle), the vehicle computer may read the information from this key and electronically send relevant information to other sub-systems. For example, the key may contain information regarding the driver's seat position or the driver's radio station preferences. Likewise, this key may contain information about the driver's height and weight. When the key is inserted, this information may be electronically transmitted to the controller 120, which may automatically adjust the position of the airbag housing accordingly. Other similar devices may be used to identify the occupant without having to actually estimate the occupant's weight or height, as discussed above.

Continuing to refer to FIG. 1, the controller 120 may assume a number of forms. In one embodiment, the controller 120 may comprise a stand-alone computer or microcontroller-based system. In another embodiment, the controller 120 may be contained in another sub-system, such as the airbag deployment computer. Still other embodiments may be implemented in whole or in part by software instructions executing on a computer or microcontroller. In addition, the controller 120 may be located near the airbag housing 112, as depicted in FIG. 1, or even within the airbag housing 112. The controller 120 may also be located in any other part of the vehicle. Those skilled in the art may recognize that the controller 120 may assume many different embodiments.

Again referring to FIG. 1, the weight sensor 132 may, in one embodiment, take the form of a pressure sensor embedded in the seat cushion. Such a sensor may detect the weight of the occupant seated in the seat. Another embodiment may include a sensor on each supporting leg of the seat. In this embodiment, each leg sensor may transmit a feedback signal to the controller 120 representing the weight on each leg of the seat. The controller 120, in turn, may sum these individual weights in order to estimate the overall weight of the occupant. Other types of sensors may be used in lieu of these sensors. The height sensor 134 may also assume different forms. As an example, the height sensor 134 may comprise an ultrasonic device capable of measuring the distance between the sensor and the top of the occupant's head. In other embodiments, the height sensor 134 may be a capacitive or laser sensor.

Figure 5:
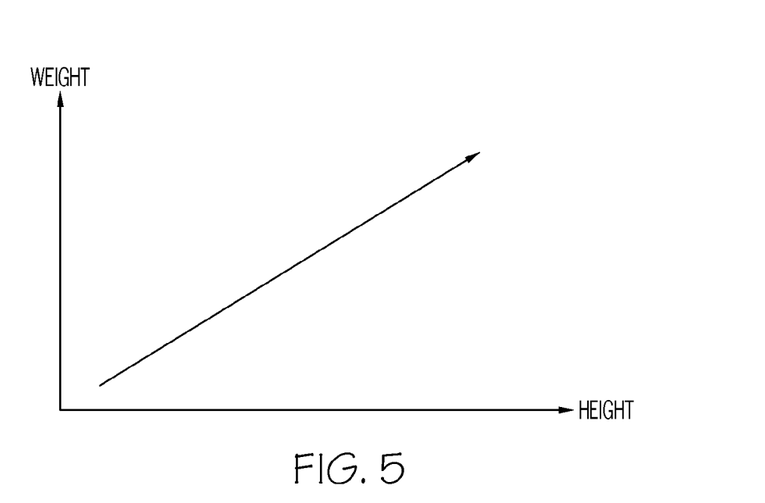
FIG. 5 graphically depicts the general relationship between a person's weight and height according to one or more embodiments shown and described herein.

As discussed above, FIG. 5 shows the general relationship between a person's weight and height. This relationship is relatively linear, and the controller may use this relationship to estimate a person's height by knowing the person's weight. This graph can vary from country to country, region to region, and even over time. Accordingly, one embodiment of the controller may use a different weight-height graph for the United States than for Europe. Other embodiments may use similar techniques in order to improve the overall accuracy of the height estimation in different markets or regions.

In FIG. 6, the relationship between the sensor(s), the controller, and the actuator(s) is shown. As discussed herein, the sensor (or sensors) may acquire information about a physical characteristic of the occupant, such as weight or height. The sensor may send a feedback signal representing this information to the controller. Although FIG. 6 only depicts one sensor, one or more sensors may be used in order to determine one or more physical characteristics of the occupant. The controller may process the feedback signal(s) and may determine a position of the airbag housing which may improve the protection of the occupant. This may be accomplished by targeting a certain contact area of the occupant should the inflatable airbag be deployed. The controller may send a control signal to the actuator(s) in order to adjust the position of the airbag housing accordingly. Although only one actuator is depicted, it is contemplated that one or more actuators may be employed in order to adjust the airbag housing.

Still referring to FIG. 1, the adjustable airbag system 100 may operate as follows. The sensor or sensors 132, 134 may operate to measure a physical characteristic of an occupant of the vehicle. This measurement may take place, as an example, when the vehicle is first started. Alternatively, this measurement may take place, as another example, when a door of the vehicle is closed. The sensor(s) may send a feedback signal representing the physical characteristic of the occupant to the controller 120. The controller 120 may, based on the feedback signal(s), determine a position of the airbag housing 112 which may improve the protection of the occupant afforded by the inflatable airbag 114. The controller 120 may send a control signal to the actuator or actuators 116A, 116B in order to adjust the position of the airbag housing 112 accordingly. Thus, if the inflatable airbag 114 were to be deployed (e.g., in a crash), it may improve the protection of the occupant by targeting a certain contact area of the occupant, as determined by the feedback signal(s).

Adjustable airbag systems, as described herein, may be placed in a number of locations in a vehicle in order to afford protection to multiple occupants and/or to multiple contact areas on a single occupant. For example, an adjustable airbag system may be placed in the steering wheel of the vehicle in order to protect the head and/or chest of the driver. In another example, an adjustable airbag system may be placed in the seat of the vehicle in order to protect the chest area of the seat occupant in the event of a side impact. In yet another example, an adjustable airbag system may be placed in the roof of the vehicle to provide head protection to one or more of the occupants. All of these adjustable airbag systems may be adjusted according to the techniques described herein in order to improve the protection of the occupant. In addition, vehicles may have multiple airbag systems, some or all of which may be adjustable (according to the techniques and methods described herein) and some may be non-adjustable (i.e., conventional airbag systems). Thus, any combination of adjustable and non-adjustable airbag systems is contemplated.

It should now be understood that the systems and methods described herein may be used to adjust the position of an airbag with respect to the vehicle in order to improve the protection of the vehicle occupant.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. An adjustable airbag system for attachment to a structure of a vehicle, the adjustable airbag system comprising:
   an airbag assembly having an inflatable airbag within a housing;
   an actuator mechanically coupled to the housing, the actuator comprising:
      a spring coupled to the housing such that the spring is positioned between the housing and the structure of the vehicle, wherein the spring biases the housing away from the structure;
      a shape memory alloy device coupled to the housing such that the shape memory alloy device is positioned between the housing and the structure of the vehicle, wherein the shape memory alloy device is operable to compress the spring when a current is supplied to the shape memory alloy device;

a sensor operable to measure a physical characteristic of an occupant of the vehicle; and a controller in communication with the sensor and the actuator such that upon receiving a feedback signal from the sensor relating to the physical characteristic of the occupant, the controller sends a control signal to the actuator to adjust a position of the housing with respect to the occupant, wherein the spring and the shape memory alloy device of the actuator are arranged such that the position of the housing is adjusted only when the actuator is actuated by the control signal.

2. The system of claim 1 further comprising a second sensor to measure a second physical characteristic of the occupant wherein the second sensor is in communication with the controller.

3. The system of claim 1 wherein the inflatable airbag is a side-impact airbag.

4. The system of claim 1 wherein the actuator is operable to adjust the position of the inflatable airbag about plus or minus ten millimeters with respect to the occupant.

5. The system of claim 1 wherein the actuator is operable to adjust a tilt of the housing.

6. The system of claim 5 wherein the tilt of the housing is about plus or minus five degrees with respect to the occupant.

7. The system of claim 1 wherein the airbag assembly is mechanically coupled to a seat, a door, a dashboard, a roof, or a steering wheel of the vehicle.

8. The adjustable airbag system of claim 1 wherein the shape memory alloy device is a bolt formed from a shape memory alloy.

9. The adjustable airbag system of claim 1 wherein the shape memory alloy device is a wire formed from a shape memory alloy.

10. A vehicle having an adjustable airbag system secured to a structure of the vehicle, the system comprising:

an airbag assembly coupled to the structure of the vehicle and having an inflatable airbag within a housing;

an actuator mechanically coupled to the housing, the actuator comprising:

a spring coupled to the housing and positioned between the housing and the structure of the vehicle, wherein the spring biases the housing away from the structure;

a shape memory alloy device coupled to the housing such that the shape memory alloy device is positioned between the housing and the structure of the vehicle, wherein the shape memory alloy device is operable to compress the spring;

a sensor operable to measure a physical characteristic of an occupant of the vehicle; and a controller in communication with the sensor and the actuator such that upon receiving a feedback signal from the sensor relating to the physical characteristic of the occupant, the controller sends a control signal to the actuator to adjust a position of the housing with respect to the occupant, wherein the spring and the shape memory alloy device of the actuator are arranged such that the position of the housing is adjusted only when the actuator is actuated by the control signal.

11. The vehicle of claim 10 further comprising a second sensor to measure a second physical characteristic of the occupant wherein the second sensor is in communication with the controller.

12. The vehicle of claim 10 wherein the inflatable airbag is a side-impact airbag.

13. The vehicle of claim 10 wherein the actuator is operable to adjust the position of the inflatable airbag about plus or minus ten millimeters with respect to the occupant.

14. The vehicle of claim 10 wherein the actuator is operable to adjust a tilt of the housing.

15. The vehicle of claim 14 wherein the tilt of the housing is about plus or minus five degrees with respect to the occupant.

16. The vehicle of claim 10 wherein the airbag assembly is mechanically coupled to a seat, a door, a dashboard, a roof, or a steering wheel of the vehicle.

17. A vehicle having an adjustable airbag system secured to a structure of the vehicle, the system comprising:

an airbag assembly coupled to the structure of the vehicle and having an inflatable airbag within a housing;

an actuator mechanically coupled to the housing, the actuator comprising:

a spring coupled to the housing and positioned between the housing and the structure of the vehicle, wherein the spring biases the housing away from the structure;

a shape memory alloy device coupled to the housing such that the shape memory alloy device is positioned between the housing and the structure of the vehicle, wherein the shape memory alloy device is operable to compress the spring;

a key containing physical characteristic information about a driver; and a controller in communication with the sensor, the key and the actuator such that, upon receiving physical characteristic information about the driver from the key, the controller sends a control signal to the actuator to adjust a position of the housing with respect to the driver.

18. The vehicle of claim 17 wherein the inflatable airbag is a side-impact airbag.

19. The vehicle of claim 17 wherein the actuator is operable to adjust the position of the inflatable airbag about plus or minus ten millimeters with respect to the occupant.

20. The vehicle of claim 17 wherein the actuator is operable to adjust a tilt of the housing by about plus or minus five degrees.

\* \* \* \* \*